United States Patent [19]

Gebelius

[11] 4,453,613
[45] Jun. 12, 1984

[54] LOAD SUPPORTING DEVICE

[76] Inventor: Sven R. V. Gebelius, Drottningholmsvägen 195, Bromma, Sweden, S-161 36

[21] Appl. No.: 296,341

[22] Filed: Aug. 26, 1981

[51] Int. Cl.³ .............................................. B60V 1/00
[52] U.S. Cl. ................................... 180/125; 280/43.12
[58] Field of Search ....................... 180/125, 119, 120; 280/43.12, 43.24; 406/88; 414/676

[56] References Cited

U.S. PATENT DOCUMENTS

| | | | |
|---|---|---|---|
| 2,176,307 | 10/1939 | Lamb et al. | 406/88 |
| 2,985,114 | 5/1961 | Lindner | 180/125 |
| 3,174,571 | 3/1965 | Cocker et al. | 180/125 |
| 3,239,024 | 3/1966 | Christian | 180/125 |
| 3,273,727 | 9/1966 | Rogers et al. | 180/125 |

Primary Examiner—David M. Mitchell
Attorney, Agent, or Firm—Holman & Stern

[57] ABSTRACT

A load supporting device to facilitate transport of a load carrying unit along a supporting surface comprises a piston member having a restricted movement in a cylinder member towards and from the supporting surface, a recess open towards the supporting surface, and a spherical supporting member in said recess movable in relation to the piston member to a position partly out from the piston member a channel in the piston provides flow communicating between said recess and the end of the piston member opposite the end from which the spherical member can extend, and an inlet member through the cylinder member is connected to a gas source under pressure to supply gas to the end portion of the piston member adjacent the channel move the piston member and/or the spherical supporting member to a position in which the spherical supporting member contacts the supporting surface, in which position the gas may flow past the spherical supporting member while maintaining an increased pressure in the recess to produce a lifting movement of the load carrying unit from the supporting surface. A valve member is located in the channel to restrict the gas flow to the recess when the spherical supporting member is located in an extended position from the piston member without contacting the supporting surface.

11 Claims, 4 Drawing Figures

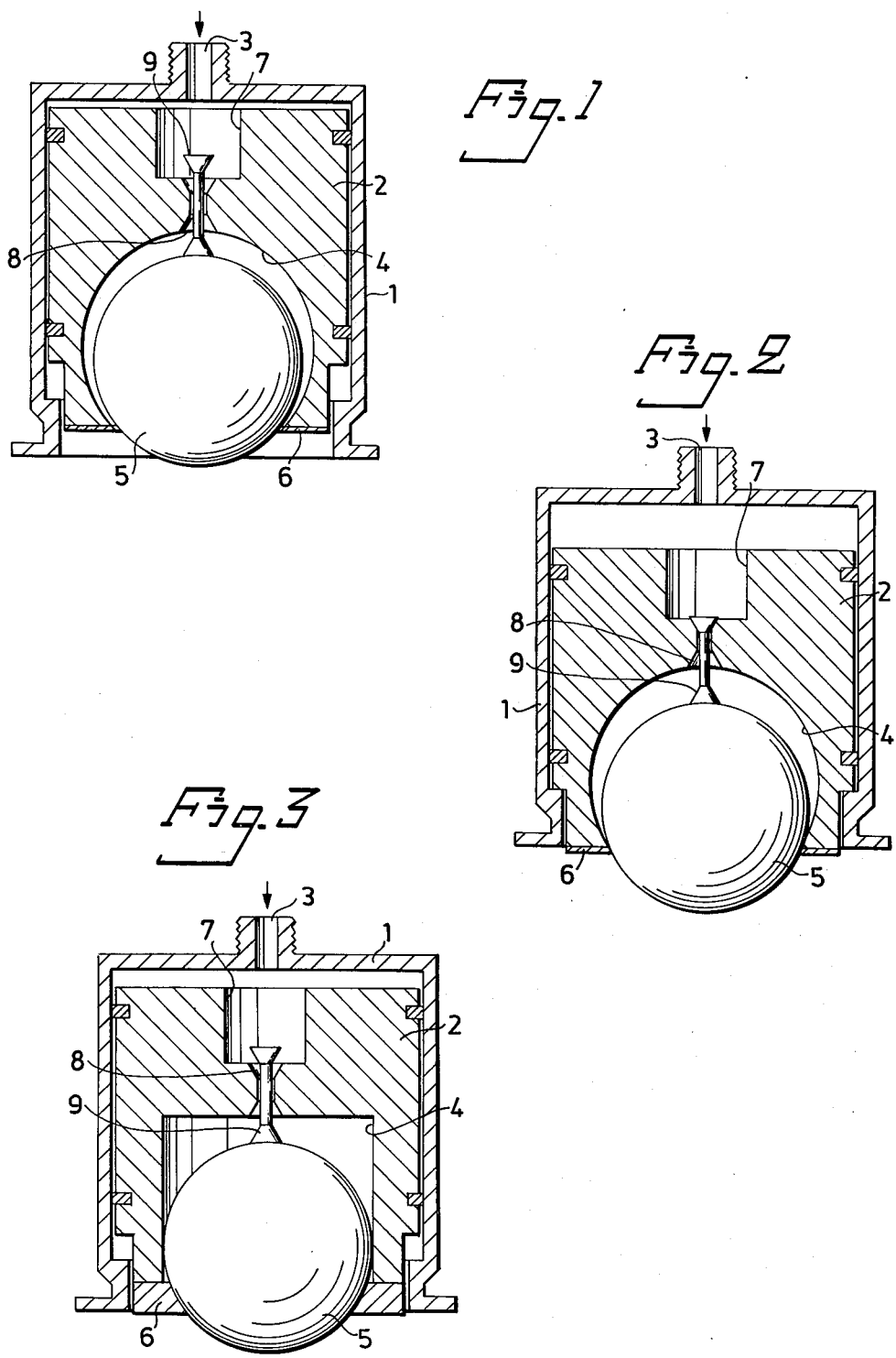

LOAD SUPPORTING DEVICE

BACKGROUND OF THE INVENTION

1. Field of the Invention

The present invention relates to a load supporting unit, for use with loading pallets, or similar units, used to support goods during transport and storage. The term "load supporting device" also includes other types of devices, e.g. units utilized to support objects during manufacture, which objects are to be moved between various assembly, control or test stations when manufactured. Also other types of load carrying units are included, intended to facilitate transport of a supported load.

2. Description of the Prior Art

With regard to loading pallets and similar types of load carrying devices, a transport operation, e.g. from a storage area to another location or to a transport vehicle, is carried out by means of a suitable lifting device, such as fork lift trucks, manually movable hydraulically operable lifting devices, or similar devices. Especially for short transport distances, manually movable lifting devices are used, e.g. for transport operations on the back of a lorry or for short transports within a warehouse for example. As a result, suitable devices must usually be carried on each transport vehicle, and corresponding devices must also be available in required number within the premises where transport is to be carried out. Load supporting units utilized for production in series may either be arranged by placing them on a suitable conveyor, such as a conveyor belt or a roller conveyor, or the units may be moved between the manufacturing stations by means of an air cushion, i.e. compressed air is supplied to each unit and directed towards the floor surface by nozzles, whereby the air jets directed towards the floor surface accomplish a lifting effect, intended to faciliate transport of the unit from one station to another.

BRIEF SUMMARY OF THE INVENTION

The object of the present invention is to provide a device, which can be used for various types of load carrying units, and which faciliates transport of a unit without need for any transport devices. The device is particularly suitable for short distance transport, e.g. within certain premises, on the back of a lorry when loading/unloading, for similar applications. The transport is achieved by application of a small manual force. The device according to the present invention is further based on the availability of compressed air, e.g. a small container of compressed air located on the load carrying unit, but the air consumption during a transport movement is considerably lower than previously known devices of the air cushion type, which means that a rather small volume of air is required for long transport distances, or repeated short transports.

The device according to the present invention is intended to be used in connection with a load carrying unit, and facilitates transport of the load carrying unit along a supporting surface by means of application of a force in the intended direction of transport, and is mainly characterised in that a number of devices are located on the load carrying unit, each device including a piston member movable in a direction towards the supporting surface, said piston member having an open recess in the direction towards the supporting surface surrounding a spherical supporting member, and including an inlet member, communicating with a gas source under pressure and arranged to facilitate supply of said gas into an area adjacent to the end portion of the piston member opposite to the end portion where the spherical supporting member is arranged movable in a direction toward and from the recess. The device further includes a channel in flow-communication between the recess and the inlet adjacent to the end portion of the piston member, said spherical supporting member being arranged to facilitate a sliding movement to a position extending partly outside the adjacent end surface of the piston member, whereby supplied gas to the inlet member is arranged to cause a movement of the piston member and/or the spherical supporting member to a contact position for the spherical supporting member against the supporting surface, and in said contact position flow past the spherical supporting member, whereby the flowing gas removes the spherical supporting member from contact with surrounding wall portions in the recess.

BRIEF DESCRIPTION OF THE DRAWINGS

A number of embodiments according to the present invention are more fully described below, reference being made to the accompaying drawings wherein;

FIG. 1 is a cross-sectional view of a first embodiment of a device according to the present invention, showing the device in a first position, FIG. 2 is a cross-sectional view corresponding to FIG. 1, showing the device in a second position, FIG. 3 is a cross-sectional view of a slightly modified embodiment of the device according to the present invention.

DETAILED DESCRIPTION

Figure 4:
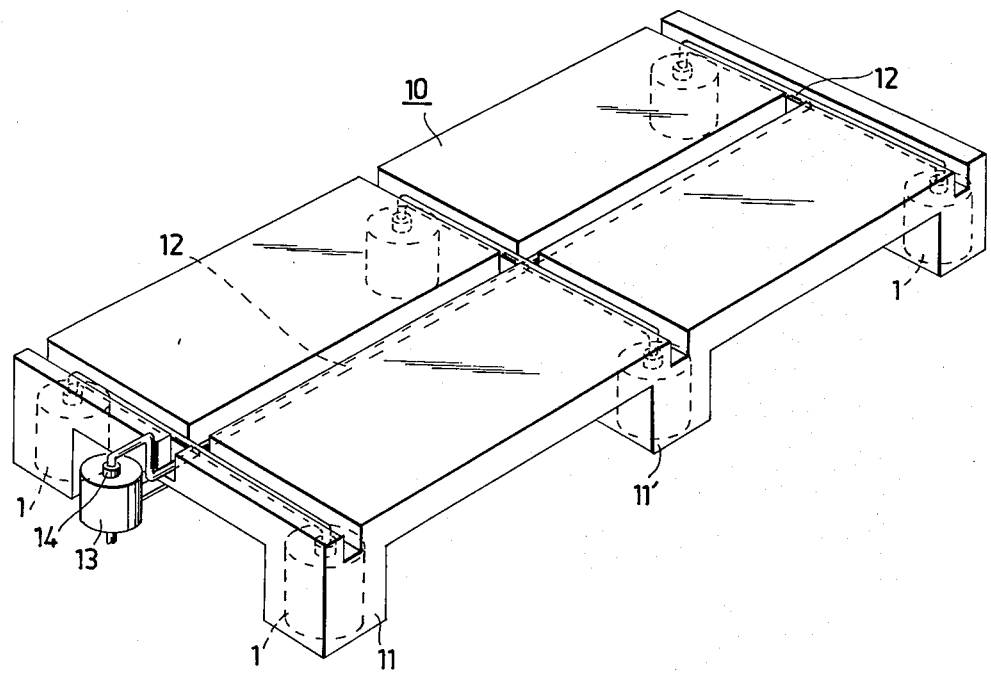
FIG. 4 is a perspective view of a load carrying unit, arranged with a number of devices according to the present invention.

The embodiment shown in FIGS. 1-2 comprises a surrounding, cylindrical housing 1, in which a piston member 2 is slidable a limited distance. The housing 1 further includes an inlet member 3, communicating with a compressed air source. From the end surface of the piston member 2 opposite the inlet member 3, a part spherical recess 4 is extends into the piston member 2. A spherical ball-shaped supporting member 5 is disposed in recess 2. A washer shaped abutment or retaining member 6 is attached against the end surface of the piston member 2 from which the spherical recess 4 extends, and the centrally located hole of the washer-shaped abutment member 6 has a diameter smaller than the diameter of the spherical ball-shaped supporting member 5, which thereby is held in a position substantially completely surrounded by the recess 4. From the end surface of the piston member 2 directed towards the inlet member 3, a hole 7 extends in a adjacent the spherical recess 4, and at the inner end there is provided a channel 8, having conically enlarged end portions, which serve as valve seats for a longitudinally extending valve member 9 extending through the channel 8.

The above described embodiment is attached to a load carrying unit, e.g. as indicated in FIG. 4, which shows a loading pallet, as a complete unit denominated 10 having fixed on the side facing a floor surface, or a similar surface, supporting members 11, 11'. In each of the supporting members 11, 11' is provided a device of the type described with reference to FIGS. 1-2, having the inlet member 3 attached to a pipe system 12 connected to a compressed air container 13, arranged with a flow restricting valve member 14. Each device is attached to the supporting members 11, 11' in such a way, that the spherical ball-shaped supporting member 5 is directed towards the floor surface or similar surface on which the load carrying unit is disposed.

When the valve member 14 is in a position so that compressed air is not supplied to the inlet members 3 and the load carrying unit 10 is intended to take up a stationary position, each device takes up a first position as shown in FIG. 1, i.e. the load carrying unit 10 rests in a conventional way on the supporting floor surface on the free end surfaces of the supporting members 11, 11'.

When it is desired to move the load carrying unit 10, the valve member 14 is operated whereby compressed air is supplied to each unit from the compressed air container 13 via the pipe system 12, connected with the inlet members 3 of each device. As a result, the supplied compressed air flows through the hole 7 via the channel 8 into the spherical recess 4, whereby the spherical ball-shaped member moves towards the supporting surface located under the load carrying unit 10. When this movement take place, two alternative results may be accomplished.

If the supporting surface is a completely plane floor surface, located immediately under the end surface of the support members 11, 11', the spherical ball-shaped member 5 takes up contact with the supporting surface in a position mainly corresponding to the first position shown in FIG. 1, and the supplied compressed air flows past the spherical ball-shaped supporting member 5 in a small surrounding air passage, formed between the member 5 and the surrounding washer-shaped member 6. The air pressure acting on the upper portion of the spherical ball-shaped supporting member 5 thus causes a lifting movement for the load carrying unit 10, whereby said supporting member 5, due to the surrounding flowing air, does not take up mechanical contact with surrounding parts, i.e. said supporting member 5 is arranged in a mainly non-frictional condition in relation to surrounding parts. The load carrying unit 10 can thus be moved by application of an extremely small manual force.

As mentioned previously an alternative result can also be achieved, when the valve member 14 is operated, which result is also achieved during a transport movement when the supporting surface, e.g. a floor surface, has small irregularities. When the first sliding movement in relation to the piston member 2 of the spherical ball-shaped supporting member 5 does not cause the supporting member 5 to take up contact with the supporting surface, said sliding movement is performed until the portion of the valve member 9 adjacent to the inlet member 3 takes up a contact position against the co-acting valve seat in the channel 8, whereby air is no longer supplied to the spherical recess 4, but only to the hole 7 and adjacent end portion of the piston member 2. As a result, the piston member 2 is moved in towards the supporting surface to a position in which the spherical ball-shaped supporting member 5 takes up contact with the supporting surface. Since the spherical supporting member 5 in the moment of contact is not under the influence of any lifting force, caused by compressed air supplied to the surrounding recess 4, a continued sliding movement of the piston member 2 causes the spherical supporting member to influence the valve member 9, which is moved from its sealing contact position against the valve seat adjacent to the inlet member 3, whereby compressed air is supplied to the spherical recess 4 via the channel 8. As a result, a lifting position is achieved, in which the spherical ball-shaped supporting member takes up a mainly non-frictional condition as described before.

During a transport movement, said piston member 2 thus takes up various relative positions in relation to the surround housing 1, in order to adjust to existing irregularities in the supporting surface.

However, a further position may also exist, apart from the position in which the piston member 2 facilitates such a transport movement that the spherical supporting member 5 takes up contact with a supporting surface. This condition can also result when the load carrying unit 10 for example is to be moved over a supporting surface having a deep hole or groove, in which case it is desirous to prevent air leakage from the device concerned. As shown in FIG. 2, such a leakage is prevented partly because of the valve member 9 taking up contact against the valve seat at the channel 8 directed towards the inlet member 3, and due to the fact that the spherical ball-shaped supporting member 5 takes up contact against the washer-shaped abutment member 6. Air leakage is thereby completely elminated from a device, which for any reason does not contact a supporting surface, thus not serving as a supporting device for the load carrying unit 10.

If a spherical supporting member 5 during a transport movement for any reason should be made subject to a sudden force, e.g. when passing a door sill or similar, the member 5 can obviously be rapidly moved in direction towards the bottom portion of the spherical recess 4, and such a movement is only for a short period of time, causing the surrounding air passage to be enlarged with excessive air leakage. However, this leakage is reduced due to the fact that the valve member 9 can also take up a sealing contact against the conical valve seat in channel 8 adjacent the spherical recess 4, whereby air supply to said recess is intermittently interrupted, which also causes a reduced air consumption.

In the above described embodiment, the recess 4, which surrounds the spherical supporting member, has been described as part spherical. In view of the fact that such a design from a manufacturing point of view is often costly and thus not preferred, FIG. 3 shows an example of a modified embodiment. This embodiment has basically correspondingly arranged parts to the above described embodiment, but said recess 4' has a cylindrical shape, and the washer-shaped abutment member 6' is thicker, having the internal edge portion of the centrally located hole provide with a curved surface adapted to substantially conform to the spherical supporting member 5. According to this embodiment, an air passage is achieved when compressed air is supplied between the spherical supporting member 5 and the cylindrical wall surface of the recess 4', and also between the spherical supporting member 5 and the centrally located hole in the washer-shaped abutment member 6'. The operation of this embodiment is as disclosed with reference to previous embodiments.

During a transport movement, when the spherical supporting member 5 is rolling against a supporting surface, a side force may be imposed on the valve member 9, caused by existing friction between the part of the valve member 9 which is in contact with the spherical supporting member 5 and the outer surface of said member. Such a force exists, if the long axis of the valve member 9 corresponds with the center of the spherical supporting member 5. However, this problem can be overcome in various ways, e.g. by arranging the contact surface of the valve member 9 curved, in order to reduce the size of the contact surface, or by covering said contact surface with a suitable friction reducing material. A preferred alternative is, to move the center of the long axis of the valve member 9 in relation to the rotary center of the spherical supporting member 5, whereby a rotary movement of the spherical supporting member 5 provides a rotary movement for the valve member 9, whereby the previously discussed side force is transformed into a rotary force acting on the valve member 9.

As previously discussed, there is no air leakage in those cases when the spherical supporting member 5 does not take up contact with a supporting surface, partly due to the valve member 9, and partly due to the contact of the spherical supporting member 5 against the washer-shaped abutment member 6. It should be realized, that the seal achieved between the spherical supporting member 5 and the washer-shaped abutment member 6 can be further improved, if the portion of the abutment member 6 which takes up contact with the spherical supporting member 5 is arranged with a coating of a suitable flexible sealing material, such as rubber, synthetic plastics or similar material. It should also be mentioned, that the above double security against leakage obviously is based on the fact that the valve member 9 in closed position no longer takes up direct contact with the spherical supporting member 5.

The present invention is not restricted to the shown and described embodiments, since many modifications obviously can be made within the scope of the invention.

Accordingly, the piston member 2 can be arranged as a unit comprising two joined members, which are joined in a position surrounding the spherical supporting members 5 whereby the previously discussed washer-shaped abutment may be excluded, since the recess 4, or 4' can be arranged with such a shape, that said member 6 is replaced. Furthermore, it has been stated that the piston member 2 is arranged slidable a restricted distance in a surrounding housing 1. In the described and shown embodiment this is accomplished by arranging the piston member 2 with two different diameters, defining a first guiding and sealing portion, and a second part with a smaller diameter, and the surface between said diameters being used as a movement restricting member in connection with a co-acting abutment surface in the housing 1. A corresponding restriction of movement can obviously by achieved by using other previously known means, whereby it would be possible to arrange the piston member 2 with a uniform external diameter, whereby manufacturing costs can be reduced. The housing 1 can also be an integrated part with the unit in which the device is to be arranged, preferably arranged as a cylindrical cylinder, in which the piston member 2 can be moved a restricted distance. For applications where a small air consumption is not primarily controlling, the valve member 9 can also be excluded from the design, whereby sealing is only achieved in relation to the lower edge portion of the recess 6 surrounding the spherical supporting member 5. It should also be mentioned, that compressed air obviously can be supplied in other ways than from a container 13, located by the load carrying unit 10. Accordingly, compressed air can be supplied to the load carrying unit 10 by means of a hose connected to an available compressed air source.

Since many modifications are possible, as indicated above, the present invention is in no way restricted to described and shown embodiments, which only serve as examples of embodiments within the scope of the invention and the following claims.

I claim:

1. A load supporting device to facilitate transport of a load along a supporting surface comprising a cylinder member having an open end to be positioned in use adjacent the supporting surface, a piston member restrictably movable in said cylinder member towards and away from said open end of said cylinder member, a recess in said piston member opening through the end thereof adjacent said opening in said cylinder member, a spherical supporting member in said recess, an inlet through said cylinder member communicating with the other end of said piston member opposite to said open end and adapted to be connected to a gas source under pressure to supply said gas to said other end of said piston member, a channel in said piston member communicating between said recess and said other end of said piston member, said spherical supporting member being movable in said recess into and from a position extending partly through said opening in said piston member so that pressurized gas supplied to the inlet will move the piston member in the cylinder member and/or the spherical supporting member in said recess to a contact position where the spherical supporting member contacts the supporting surface and will flow past said spherical supporting member through said opening in said recess to retain said spherical supporting member out of contact with a surrounding wall portion in said recess, and a longitudinally extending valve member in said channel adapted to close said channel from flow communication with said inlet when said spherical supporting member is in an outer restricted position where it extends from the piston member a maximum distance.

2. Device according to claim 1 wherein said recess has a concave spherical shape.

3. Device according to claim 1 wherein said recess has a substantially circular cross-sectional shape.

4. Device according to claim 1 wherein said opening through the end of said piston member has a circular cross-sectional area smaller than the maximum cross-sectional area of said spherical supporting member.

5. Device according to claim 4 and further comprising a washer-shaped retaining member attached to the piston member at the end through which said spherical supporting member extends, and a centrally located hole in said retaining member having a cross-sectional area smaller than the maximum cross-sectional area of said spherical supporting member.

6. Device according to claim 5 wherein said centrally located hole has an edge portion having a shape substantially corresponding to the shape of the spherical supporting member.

7. Device according to claim 1, 2 or 3 and further comprising a valve on the end of said valve member adjacent said recess and a coacting valve seat in the recess end of said channel, so that said valve engages said valve seat when the spherical supporting member is in an inwardly restricted position displaced from said opening of the recess.

8. Device according to claim 5 and further comprising the surface of said hole in said retaining member is provided with a sealing member made of a material from the group comprising rubber, synthetic rubber, and synthetic plastics.

9. Device according to claim 1 wherein the longitudinal axis of said valve member is displaced with respect to a line colinear with a diameter of the spherical supporting member.

10. Device as claimed in claim 6 and further comprising a valve on the end of said valve member adjacent said recess and a coacting valve seat in the recess end of said channel, so that said valve engages said valve seat when said spherical supporting member is in an inwardly restricted position displaced from said opening of the recess.

11. Device as claimed in claim 6 and further comprising a valve on the end of said valve member adjacent said other end of said piston member, and a coacting valve seat in the end of said channel at said other end of said piston member, so that said valve engages said valve seat when said spherical supporting member is in said outer restricted position.

* * * * *